Figure 1:
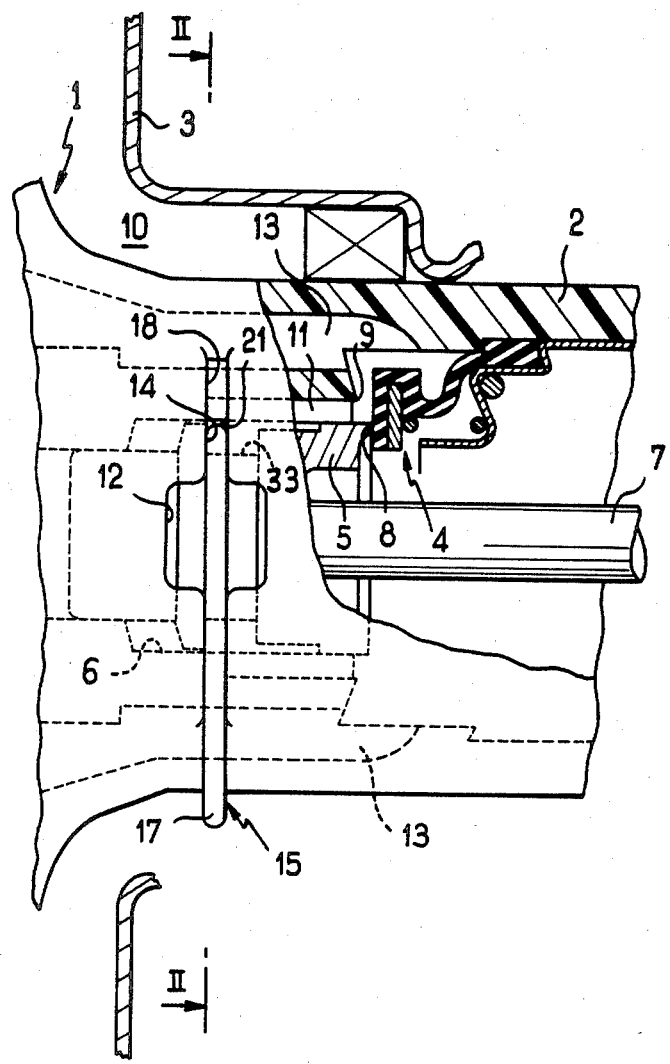

United States Patent [19]

Blot

[11] Patent Number: 4,729,286
[45] Date of Patent: Mar. 8, 1988

[54] BRAKE BOOSTER COMPRISING A VALVE PLUNGER STOP MADE OF METAL WIRE

[75] Inventor: Jean-Claude Blot, Louvres, France

[73] Assignee: Bendix France, Drancy, France

[21] Appl. No.: 907,432

[22] Filed: Aug. 12, 1986

[30] Foreign Application Priority Data

Sep. 19, 1985 [FR] France ................................ 85 13904

[51] Int. Cl.$^4$ ................................................ F15B 9/10
[52] U.S. Cl. ................................ 91/369 A; 91/376 R
[58] Field of Search ............ 91/369 R, 369 A, 369 B, 91/369 C, 376 R; 403/155, 326

[56] References Cited

U.S. PATENT DOCUMENTS

| | | | |
|---|---|---|---|
| 3,688,647 | 9/1972 | Kyita | 91/369 C X |
| 4,192,220 | 3/1980 | Tateoka | 91/369 R |
| 4,505,058 | 3/1985 | Peterson | 403/326 X |
| 4,633,760 | 1/1987 | Wagner | 91/376 R X |

FOREIGN PATENT DOCUMENTS

| | | |
|---|---|---|
| 3031224 | 3/1982 | Fed. Rep. of Germany . |
| 3344730 | 6/1985 | Fed. Rep. of Germany ... 91/369 A |
| 1388743 | 1/1965 | France . |
| 2493784 | 5/1982 | France ............................ 91/369 C |

Primary Examiner—Robert E. Garrett
Assistant Examiner—Mark A. Williamson
Attorney, Agent, or Firm—Larry J. Palguta; Ken C. Decker

[57] ABSTRACT

The hub (2) of the booster piston of the brake booster, in which the valve plunger (5) slides, comprises two opposite radial cavities (18), the stop key (15) of the plunger being formed from metal wire and comprising two facing stop portions (16) which are joined by an intermediate arch (17) and which are each housed in a central housing portion (20) of the corresponding radial cavity, each stop portion (16) being extended by an end portion (26) which comes to bear against a corresponding bearing surface (23) of the radial cavity (18).

5 Claims, 2 Drawing Figures

BRAKE BOOSTER COMPRISING A VALVE PLUNGER STOP MADE OF METAL WIRE

The present invention concerns brake boosters of the type incorporating a booster piston provided with a tubular hub enclosing a distribution valve means actuatable by a valve plunger, which is axially movable in the hub and is coupled to an input rod of the booster, and a valve plunger stop key, which is made from metal wire and is elastically mounted on the hub with at least one stop portion of the key housed in a radial cavity of the hub so as to cooperate in engagement with the valve plunger in order to limit its movement in the hub.

A brake booster of this type is described in French Patent Application No. 84-12,864, in the name of the Applicant Company, whose contents are assumed to be incorporated herein for reference. In the said document, the stop portion of the key is formed by a central portion in the shape of a C or a Y which is introduced radially into the radial cavity of the hub which consequently must be of a considerable size, the key being held in position in the hub by lateral arms which cooperate in elastic engagement with the outer periphery of the hub. This arrangement is perfectly suitable for booster pistons which, in a conventional manner, are made of bakelite. The development of plastics has led manufacturers to prefer the construction of booster pistons in thermoplastics which are lighter but which impose restrictions regarding the size of openings or internal passages in the hub.

It is an object of the present invention to provide a novel arrangement of a booster piston hub and a plunger stop key whose design is simple, which is robust and reliable, and whose manufacturing cost is low, which requires a minimum space, which allows the stop key to be placed in position in the hub easily and rapidly while ensuring perfect positioning and holding of the key in position in the hub.

To achieve this, according to a feature of the invention, the booster piston hub comprises two opposite radial cavities and the key comprises two stop portions facing one another which are joined by an intermediate arch, each radial cavity comprising a central portion for housing the stop portion of the key and an access portion which opens outwards, the transverse distance between the connecting zones between the central housing zones and the access portions of the two radial cavities being greater than the spacing between the bearing portions facing one another of the key.

Brake boosters having two opposite radial cavities in the hub are already known, for example from the document GB-A-2,076,488. The arrangement of the booster described in the document, however, puts into operation two independent stop keys, each of which is inserted in the corresponding radial cavity, according to an arrangement which is expensive particularly as regards the cost of mounting, external means also having to be provided so as to maintain each key in position in its radial cavity.

With an arrangement according to the invention, the dimensions of the central portions for housing the stop portions of the key may be reduced to a minimum, the elastic mounting of the key onto the hub being carried out perpendicular to the opposite radial cavities by forcing the plain web portion of the hub between the two cavities, on one side or the other of the hub, between the stop portions of the key, a further inward radial movement of the key allowing the stop portions to come to be housed in the central housing portions of the cavities, which advantageously are shaped so as to obtain, with shapes corresponding to those of the key, locking in the correct position of the key in the hub.

Figure 2:
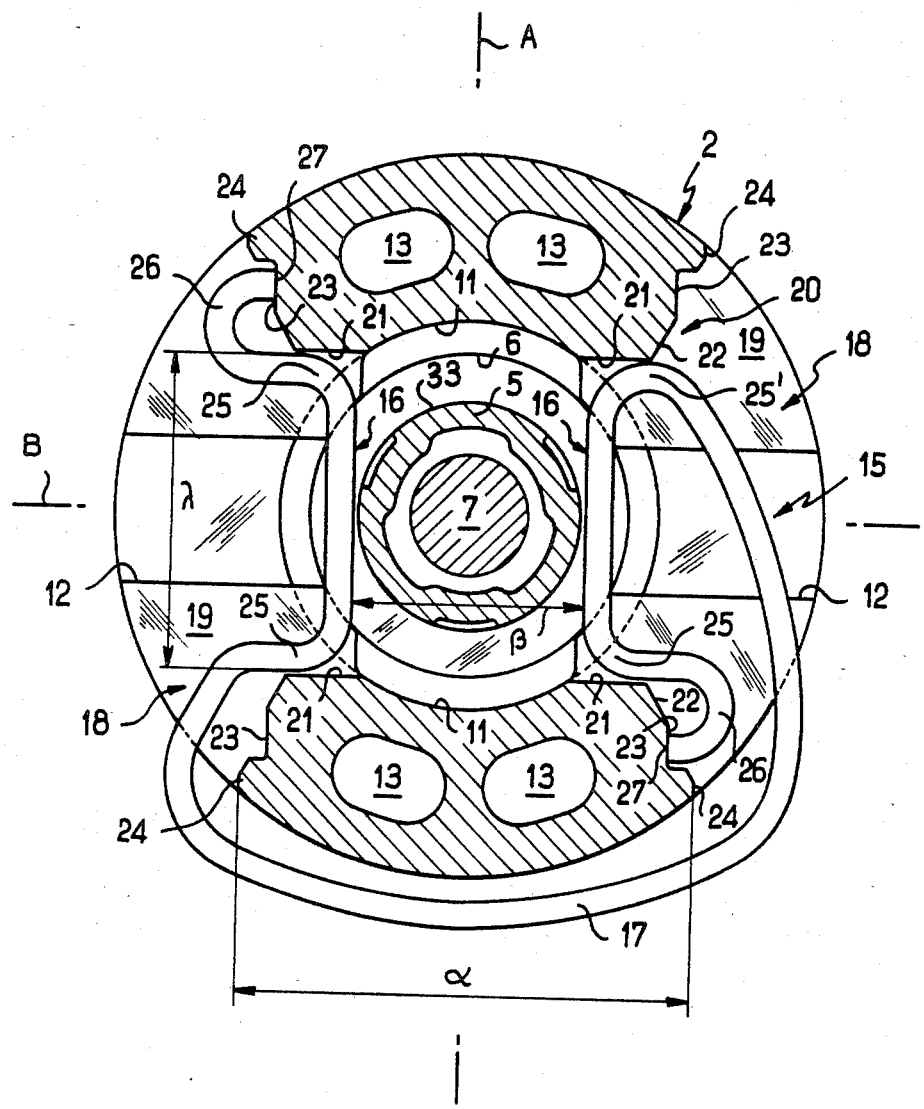

The invention will now be described by way of example with reference to the accompanying drawings, in which:

FIG. 1 is a partial view, sectioned partially longitudinally, of a brake booster hub provided with a key according to the invention; and FIG. 2 is a view sectioned transversely through the section plane II—II shown in FIG. 1.

FIG. 1 shows the central portion of a booster piston 1 forming a tubular hub 2 which is sealably, slideably mounted in the rear shell 3 of the casing of a pneumatic brake booster. A distribution valve means 4 is situated in the tubular hub 2, the distribution valve means 4 is actuated by a valve plunger 5 which slides in a central stepped bore 6 of th hub 2 and is coupled to the end of an input rod 7 of the booster which is typically coupled, at its other end, to the brake pedal of a motor vehicle (not shown). The valve means 4 is thus arranged in such a way so as to co-operate selectively with a first valve seat 8 formed by the valve plunger 5 and with a second coaxial valve seat 9 formed in the hub 2 around the plunger 5. The co-operation between the valve means 4 and the first valve seat 8 selectively interrupts communication with the rear chamber 10 of the booster, between the rear shell 3 and the piston 1, via first passages 11 which are formed in the hub around the plunger 5 and which communicate with the rear chamber 10 through radial openings 12 in the hub 2, and co-operation between the valve means 4 and the second valve seat 9 selectively interrupts communication with the front chamber of the booster (in front of the booster piston 1) via second passages 13 which are formed longitudinally in the hub 2 and which open in the front surface of the booster piston (not shown).

The valve plunger 5 comprises a peripheral annular groove 33 which defines at its forward portion a stop shoulder 14 which is intended to co-operate with a stop key, given the general reference 15, which is mounted elastically on the hub in the manner which is described below.

As shown clearly in FIG. 2, the stop key according to the invention is constructed by shaping an elastic metal wire, typically spring steel wire of a diameter of the order of 1.5 mm. The key 15 essentially comprises two stop portions 16 advantageously having the shape of straight parallel strands, which are joined to one another so as to be continuous by an intermediate arch 17. In order to house the key 15, the hub 2 comprises two opposite radial cavities in the shape of slots 18 which communicate internally with the stepped bore 6 in which the plunger 5 slides. Each radial cavity is shaped so as to form a straight access portion 19 and a central portion, given the general reference 20, for housing one of the stop portions 16 of the key 15. The key 15 has a flat general configuration, and the radial cavities 18, which are symmetrical relatve to a first axial middle plane A of the hub, have an axial width which is essentially constant and which is slightly greater than the thickness of the wire of the key 15.

According to a particular feature of the invention, the radial cavities 18 are also symmetrical relative to a second middle axial plane B of the hub which is perpendicular to the first middle plane A. Thus, the central housing portion 20 comprises centrally a rectangular channel which is defined by two transverse surfaces facing one another 21 which are parallel to the middle plane B and which open out towards the outside by ramps 22 so as to form two co-planar shoulders 23 which are parallel to the plane A. These shoulders 23 are connected to the access portion 19 forming steps 24 whose spacing, parallel to the plane B is greater than the distance between the bearing portions 16 of the key 15. Each bearing portion 16 of the key is extended at each end by a bend 25, 25' extending outwards, the overall height between the outer edges of the bends (identical for the two stop portions of the key) being slightly smaller than the distance between the surfaces facing one another 21 of a central housing portion 20 of the radial cavities 18, which ensures perfectly centered positioning of the stop portions in the hub.

According to another feature of the invention, the bend 25 at one end of each stop portion 16 is extended by a hook 26 which is folded inwards whose free end 27 comes to bear against a corresponding stop surface 23 of the central housing portion 20 of the corresponding radial cavity in such a way so as to ensure perfectly centered positioning relative to the plane A of the stop portions 16, preventing in particular the latter from rubbing against the bottom of the groove 33 of the plunger 5.

In the preferred embodiment shown in FIG. 2, the hooks 26 are formed in opposition for the two stop portions 16, one of the latter (to the left in FIG. 2) is directly connected via its bend 25 to the intermediate arch 17, and the other stop portion (to the right in FIG. 2) is connected to the intermediate arch 17 via a bend 25' resembling a hairpin. It will be understood that with such an arrangement, the key 15 may be placed in position in the hub immaterially by upward radial insertion (as shown), or symmetrically, downwards, the symmetry of the cavities 18 ensuring in all cases direct, correct and balanced positioning, owing to the upper and lower opposing bearings of the two hooks 26 against the corresponding bearing surfaces 27, the intermediate arch 17 bridging externally the covering portion of the hub between the steps 24 and being partially housed and held axially in the access portions 19 of the cavities 18. As a variant, it is however possible to construct the key with two symmetrical portions having either the configuration of the left-hand portion, or the configuration of the right-hand portion shown in FIG. 2. It will be observed in the figures that the arrangement according to the invention allows the second channels 13 to be constructed symmetrically on each side of the plane B and to construct access openings 12 for the first channels 11 which are also symmetrical but relative to the plane A and having a relatively large axial length, in a general arrangement having enlarged fluid passage cross-sections towards the valve means 4 without affecting the mechanical behavior characteristics of the piston 1, 2.

I claim:

1. A brake booster, comprising a booster piston provided wit a tubular hub enclosing distribution valve means actuated by a valve plunger which is movable axially in said hub and coupled to an input rod of the booster, and a stop key for the plunger which is made from metal wire and mounted elastically on said hub with at least one stop portion of said key housed in a radial cavity of said hub so as to cooperate in engagement with said valve plunger, characterized in that the hub comprises two opposite radial cavities and said key comprises stop portions facing one another which are joined by an intermediate arch, each radial cavity comprising a central portion for housing the respective stop portion of said key and an access portion opening outwardly, a transverse distance between connecting zones located between said central portions and said access portions of said two radial cavities being greater than spacing between said stop portions facing one another of said key, each stop portion extended by an end portion which comes to bear against a bearing surface of the respective central portion, each stop portion of said key comprising a strand portion which is essentially straight and extended at each end by a bend, and the respective central portion having a height which is slightly greater than an overall distance between outer edges of said bends.

2. The booster according to claim 1, characterized in that said key is essentially flat.

3. The booster according to claim 2, characterized in that said radial cavities each have a width which is essentially constant and slightly greater than the thickness of the wire of said key.

4. The booster according to claim 3, characterized in that said radial cavities are symmetrical relative to a first axial middle plane of said hub.

5. The booster according to claim 4, characterized in that said radial cavities are symmetrical relative to a second axial middle plane of said hub which is perpendicular to said first axial middle plane.

* * * * *